3,030,311
MINERAL ACID INHIBITORS

Billy D. Oakes, Tulsa, Okla., assignor to The Dow Chemical Company, Midland, Mich., a corporation of Delaware
No Drawing. Filed Aug. 24, 1959, Ser. No. 835,402
5 Claims. (Cl. 252—147)

This invention relates to corrosion inhibitors for use in aqueous, non-oxidizing acids to inhibit the corrosion of ferrous based metals and nickel by such acids.

The corrosion inhibitors of this invention are the compounds corresponding to the formula $$X-\underset{\underset{H}{|}}{\overset{\overset{H}{|}}{C}}-O-\underset{\underset{R'}{|}}{\overset{\overset{R}{|}}{C}}-C\equiv CH$$

wherein X is —CH$_2$OH, —CF$_3$ or —C≡CH and R and R' are —H or lower alkyl.

According to the invention, a compound corresponding to the above formula is dissolved in the aqueous acid the corrosive action of which is to be inhibited. By "aqueous acid" is meant any composition comprising a non-oxidizing acid and water and does not mean to exclude the presence of other substances. By "lower alkyl" is meant alkyl radicals containing not more than four carbon atoms.

Only a small amount of the inhibitor is needed. As little as a few thousandths of 1 percent, based on the weight of the aqueous acid, significantly reduces the corrosion of iron, steel or nickel exposed to the acid. The degree of inhibition increases with the concentration of the inhibitor up to a level of about 1 percent. Beyond this point little added protection of the metal is obtained by the use of more inhibitor. Generally, it is preferred to use the inhibitors at a level of about 0.1 to 0.4 percent, this amount being adequate for most purposes.

The inhibitors of the invention are effective not only at ordinary temperatures but also at elevated temperatures up to the decomposition point of the inhibitors. All are effective at 150° and at least one at 200° F. Moreover, they are effective in various concentrations of acids, even including hydrochloric acid up to 37 percent, that is, commercial concentrated acid.

Applications in which the inhibitors are particularly useful include metal-pickling, cleaning and polishing baths, oil well-acidizing solutions, boiler-cleaning compositions and the like.

The inhibitors of this invention are either commercially available or are easily made from commercially available intermediates.

For example, methyl butynoxy ethanol (2[2',2'-dimethyl-3'-butyn-2'-oxy]ethanol)

$$HC\!:\!C\!-\!C(CH_3)_2OCH_2CH_2OH$$

is commercially available. Dipropargyl ether $$(HC\!:\!CCH_2)_2O$$

is easily made either (1) by reacting together propargyl chloride and propargyl alcohol in the presence of aqueous potassium hydroxide, or (2) by reacting symmetrical di-(1,2-bromo-)propyl ether with sodium amide in liquid amine according to the methods reported by Guermont and Marszak, Compt. rend. 235, 252–3 (1952). The new compound, propargyl 2,2,2-trifluoroethyl ether $$(HC\!:\!CCH_2OCH_2CF_3)$$

is prepared as shown in the following example.

EXAMPLE I

To 125 milliliters of substantially dry 1,4-dioxane in a 500 ml. flask was added 25 grams of 2,2,2-trifluoroethanol. Metallic sodium (6 grams) was added slowly to this solution to make sodium trifluoroethoxide. Propargyl bromide (30 grams) then was slowly stirred into the mixture, from which a precipitate of sodium bromide separated. The above listed steps all were carried out at about room temperature (20–25° C.). The resulting mixture was poured into 200 milliliters water, whereupon the sodium bromide dissolved and from which two liquid layers separated, the bottom organic layer being removed from the mix by a separatory funnel. The so-separated organic layer, after drying over anhydrous calcium chloride was distilled at atmospheric pressure, the fraction boiling at 95–97° centigrade at 747 millimeters mercury absolute pressure giving an infra-red pattern compatible with that expected for propargyl-2,2,2-trifluoroethyl ether. The refractive index of this compound was measured as 1.3818 at 20° centigrade.

In order to demonstrate the effectiveness of the inhibitors, a series of tests was run in which 0.4 percent of the inhibitor was put into a 10 or 15 percent aqueous solution of hydrochloric acid (150 ml.) held at 150° F. or 200° F. and a coupon (2.75 in. x 1.0 in. x 0.12 in.) of AISI 1010 mild steel was suspended in the solution for either 6 or 16 hrs. Thereafter the coupon was cleaned, dried and weighed to determine the amount of metal dissolved. Table I shows the results of such tests as compared with that obtained for a similar panel tested in non-inhibited 10 percent aqueous solution of hydrochloric acid.

TABLE I

Corrosion of AISI 1010 Mild Steel by 10 and 15 Percent HCl in the Presence of 0.4 Percent of an Inhibitor Having the Formula $$X-\underset{\underset{H}{|}}{\overset{\overset{H}{|}}{C}}-O-\underset{\underset{R'}{|}}{\overset{\overset{R}{|}}{C}}-C\equiv CH$$

| Ex. No. | X | R | R' | Hydrochloric acid (percent) | Corrosion, (lb./sq. ft./day) 150° F. | Corrosion, (lb./sq. ft./day) 200° F. |
|---|---|---|---|---|---|---|
| 1 | —CH$_2$OH | CH$_3$ | CH$_3$ | 10 | 0.0066 | |
| 2 | —CH$_2$OH | CH$_3$ | CH$_3$ | 15 | | 1.3 |
| 3 | —CF$_3$ | H | H | 10 | .0011 | |
| 4 | —C≡CH | H | H | 15 | .0013 | |
| 5 | —C≡CH | H | H | 15 | | 0.045 |
| 6 | No inhibitor | | | | >1 | Dissolves |

While methyl groups have been shown specifically for R and R', ethyl, propyl, isopropyl, butyl, secondary butyl, and the like may be substituted for the methyl groups with similar results. Furthermore, the two alkyl groups R and R' on a given molecule need not be identical but can each be a different member chosen from the generic group of alkyl radicals containing not more than four carbon atoms.

Results generally paralleling those shown in Table I were obtained when similar tests were run at lower temperatures, with lower or higher concentrations of hydrochloric acid, or with other ferrous metals or nickel as the test metal. Likewise, other aqueous non-oxidizing acids, such as phosphoric, sulfuric and acetic acids are similarly inhibited.

Various modifications can be made in the present invention without departing from the spirit or scope thereof for it is understood that I limit myself only as defined in the appended claims.

I claim:
1. An aqueous solution of a non-oxidizing acid con- taining an effective amount of a corrosion inhibitor compound corresponding to the formula

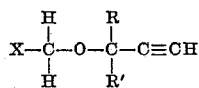

wherein X is a member selected from the group consisting of —CH$_2$OH, —CF$_3$, and —C≡CH and R and R' are members selected from the group consisting of hydrogen and lower alkyl radicals containing up to four carbon atoms.

2. An aqueous solution of a non-oxidizing acid containing from about 0.1 to about 1 percent of a corrosion inhibitor compound corresponding to the formula

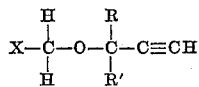

wherein X is a member selected from the group consisting of —CH$_2$OH, —CF$_3$ and —C≡CH and R and R' are members selected from the group consisting of hydrogen and lower alkyl radicals containing up to four carbon atoms.

3. An aqueous solution of a non-oxidizing acid containing from about 0.1 to about 1 percent of methyl butynoxy ethanol corrosion inhibitor.

4. An aqueous solution of a non-oxidizing acid containing from about 0.1 to about 1 percent of dipropargyl ether corrosion inhibitor.

5. An aqueous solution of a non-oxidizing acid containing from about 0.1 to about 1 percent of propargyl trifluoroethyl ether corrosion inhibitor.

References Cited in the file of this patent
UNITED STATES PATENTS

| | | |
|---|---|---|
| 2,581,283 | Newman | Jan. 1, 1952 |
| 2,662,857 | Carroll | Dec. 15, 1953 |
| 2,708,184 | Hager et al. | May 10, 1955 |
| 2,803,666 | Miller et al. | Aug. 20, 1957 |
| 2,813,862 | Arens | Nov. 19, 1957 |
| 2,946,825 | Monroe et al. | July 26, 1960 |

OTHER REFERENCES

"Acetylenic Corrosion Inhibitors," Ind. and Eng. Chem., vol. 51, No. 7, pages 825–828.